G. CHAUVIN.
COFFEE ROASTER.
APPLICATION FILED APR. 18, 1913.
1,088,537.
Patented Feb. 24, 1914.
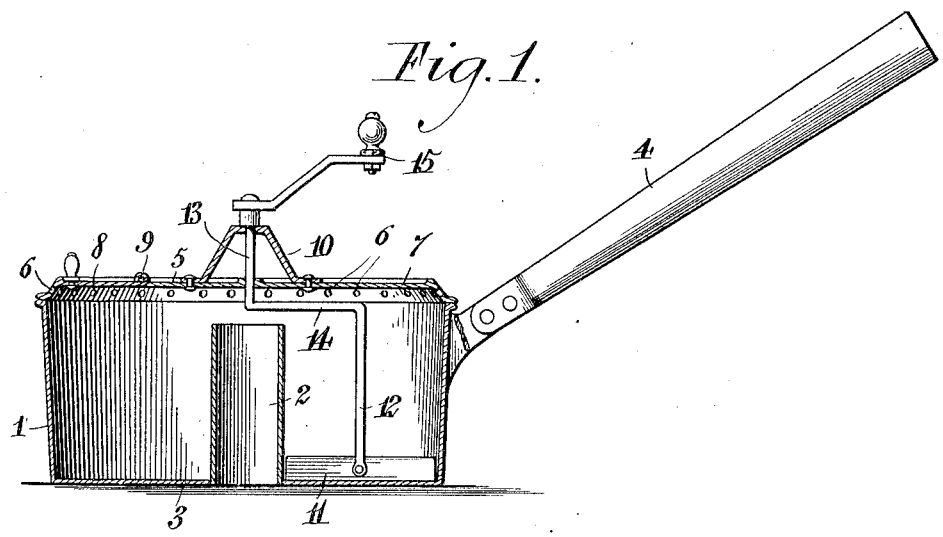
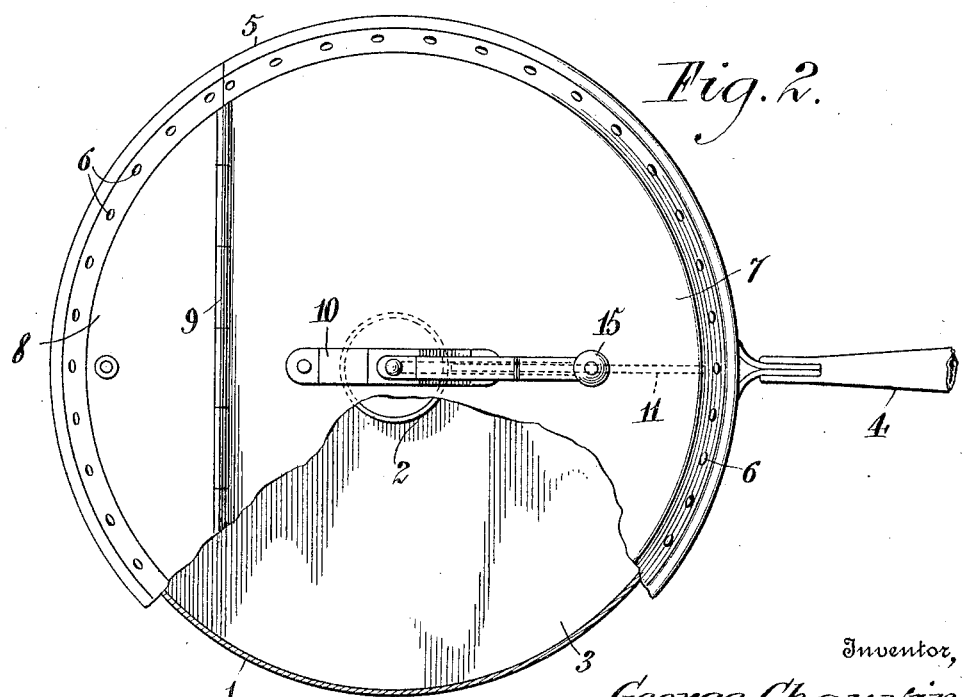
Inventor,
George Chauvin.
By Victor J. Evans,
Attorney.
Witnesses:

UNITED STATES PATENT OFFICE.

GEORGE CHAUVIN, OF UNION, LOUISIANA.

COFFEE-ROASTER.

1,088,537.   Specification of Letters Patent.   Patented Feb. 24, 1914.

Application filed April 18, 1913. Serial No. 762,099.

*To all whom it may concern:*

Be it known that I, GEORGE CHAUVIN, a citizen of the United States, residing at Union, in the parish of St. James and State of Louisiana, have invented new and useful Improvements in Coffee-Roasters, of which the following is a specification.

This invention is an improved coffee roaster, the object of the invention being to provide an improved device of this kind by means of which coffee or other material may be roasted, heated or cooked without causing the odor thereof to be diffused through the room, the construction of the roaster being such as to cause the fumes from the coffee to be drawn into the fire box of the stove and carried off through the smoke pipe and chimney, the invention consisting in the construction, combination and arrangement of devices hereinafter described and claimed.

In the accompanying drawing: Figure 1 is a vertical central sectional view of a coffee roaster constructed in accordance with my invention. Fig. 2 is partly a plan and partly a horizontal sectional view of the same.

The body 1 of my improved coffee roaster is circular in form and is provided at the center with a draft tube 2 which rises from the bottom 3 and is open at its upper and lower ends. A suitable handle 4 is here shown attached to one side of the body.

The cover 5 of the coffee roaster is arranged to be placed on the top of the body and is of substantially concavo-convex form and is provided with air intake openings 6. The cover comprises the main member 7 and a segmental member 8 which is hinged to the main member as at 9 so that it can be opened and closed from one side of the body without the necessity of removing the entire cover. On the upper side of the cover at the center thereof is a standard 10.

A coffee stirrer 11 is arranged for rotation in the bottom of the body and is connected to the depending arm 12 of a crank shaft 13. The crank 14 of the crank shaft is horizontal and is arranged below the cover and the vertical portion of the said shaft is mounted in a bearing in the center of the cover and also in a bearing in the standard 10. The crank handle 15 is attached to the upper end of the crank shaft and enables the coffee stirrer to be manually rotated, as will be understood.

Preferably, the coffee roaster is of such size as to enable it to fit on a stove hole after the lid has been removed. In the operation of my improved coffee roaster the coffee is kept stirred by the stirrer 11. The draft of the stove causes air to be drawn into the roaster through the openings 6 and the fumes from the coffee to be drawn off from the roaster through the draft tube 2 and discharged downwardly into the fire box of the stove from which they pass off through the stove pipe and the chimney and, hence, smoke and odor from the coffee is prevented from getting into the room in which the roaster is used.

The stirrer being carried by the cover of the roaster may be readily removed from the roaster together with the cover and, hence, access to all parts of the roaster may be readily attained and the roaster may be readily kept clean and in a perfectly sanitary condition. My improved coffee roaster is extremely cheap and simple, is strong and durable, is efficient in operation and its use enables coffee or the like material to be roasted without disagreeable smoke and odor.

While I have herein shown and described a preferred form of the invention, I would have it understood that changes may be made in the form, proportion and construction of the several parts without departing from the spirit of the invention and within the scope of the appended claim.

I claim:—

The herein described coffee roaster comprising a circular body having an outer wall and also having a centrally arranged draft tube opening into the roaster and also open at the bottom thereof, a cover for the body arranged on the outer wall thereof and provided with air intake openings and also provided with centrally arranged bearings, a vertical shaft carried by the cover, mounted in said bearings, having a crank handle at its upper end and provided with a crank at its lower end, under the cover, and a stirrer attached to the lower end of said crank and arranged to turn on the bottom of the body around and concentrically with the draft tube.

In testimony whereof I affix my signature in presence of two witnesses.

GEORGE CHAUVIN.

Witnesses:
 NUMA COMO,
 MORGAN ROUSSEL, Jr.

Copies of this patent may be obtained for five cents each, by addressing the "Commissioner of Patents, Washington, D. C."